Nov. 17, 1942.　　　　A. HAHN　　　　2,301,946
PRINTING DEVICE FOR SCALES
Filed Dec. 8, 1939　　　4 Sheets-Sheet 1
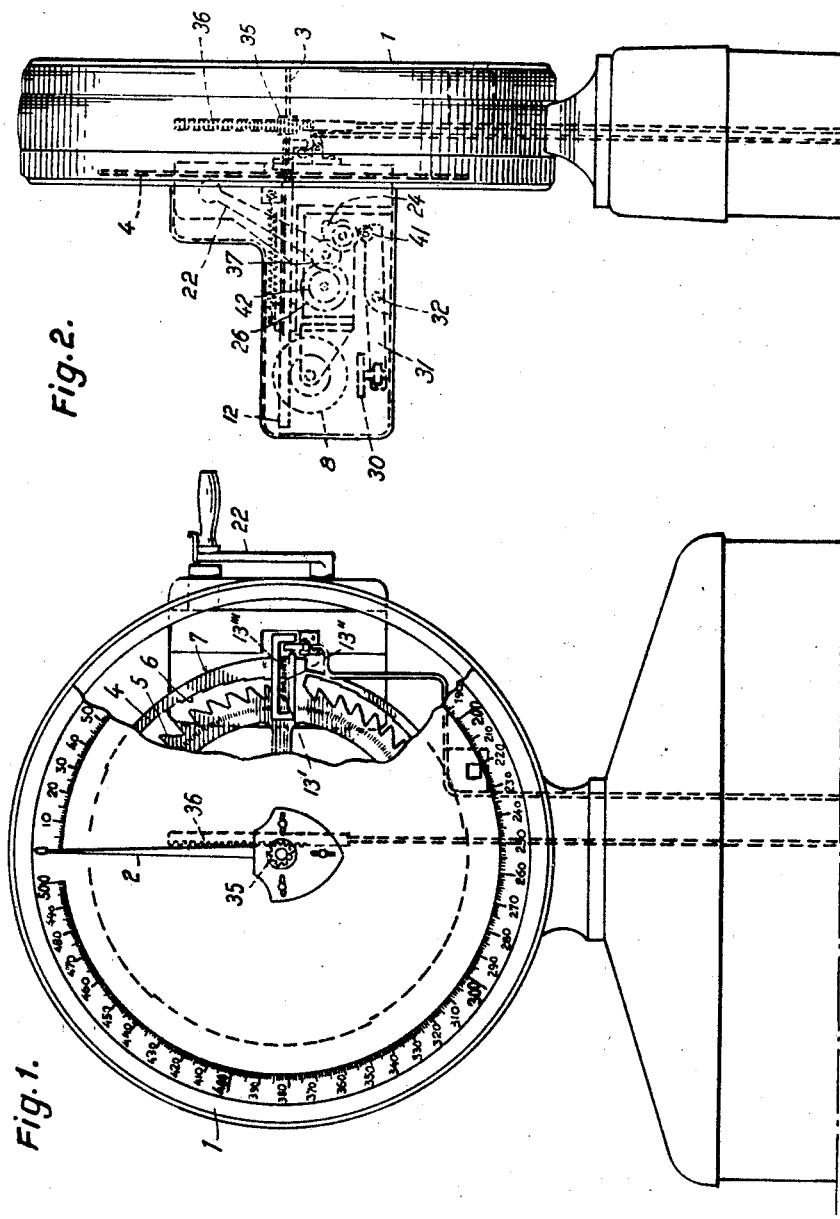
Inventor:
Arthur Hahn
By
Young, Emery & Thompson
Attorneys Nov. 17, 1942.      A. HAHN      2,301,946
PRINTING DEVICE FOR SCALES
Filed Dec. 8, 1939      4 Sheets-Sheet 3

Inventor:
Arthur Hahn
By Young, Emery & Thompson
Attorneys

Nov. 17, 1942.  A. HAHN  2,301,946
PRINTING DEVICE FOR SCALES
Filed Dec. 8, 1939   4 Sheets-Sheet 4

Inventor:
Arthur Hahn
By Young, Emery & Thompson
Attorneys

Patented Nov. 17, 1942

2,301,946

UNITED STATES PATENT OFFICE 2,301,946

PRINTING DEVICE FOR SCALES

Arthur Hahn, Balingen, Germany; vested in the Alien Property Custodian

Application December 8, 1939, Serial No. 308,277
In Germany March 1, 1937

8 Claims. (Cl. 234—5.4)

This application is a continuation-in-part of applicant's co-pending application Serial No. 179,565, filed December 13, 1937.

The present invention relates to a device which is used and built into a weighing scale and of which the object is to render it possible to weigh objects and materials which are heavier than the weighing limit of the scale. A feature of the invention is to provide a mechanism to co-operate with the highest order feeler to advance the type wheel of the highest order for weighing heavier objects.

Figure 3:
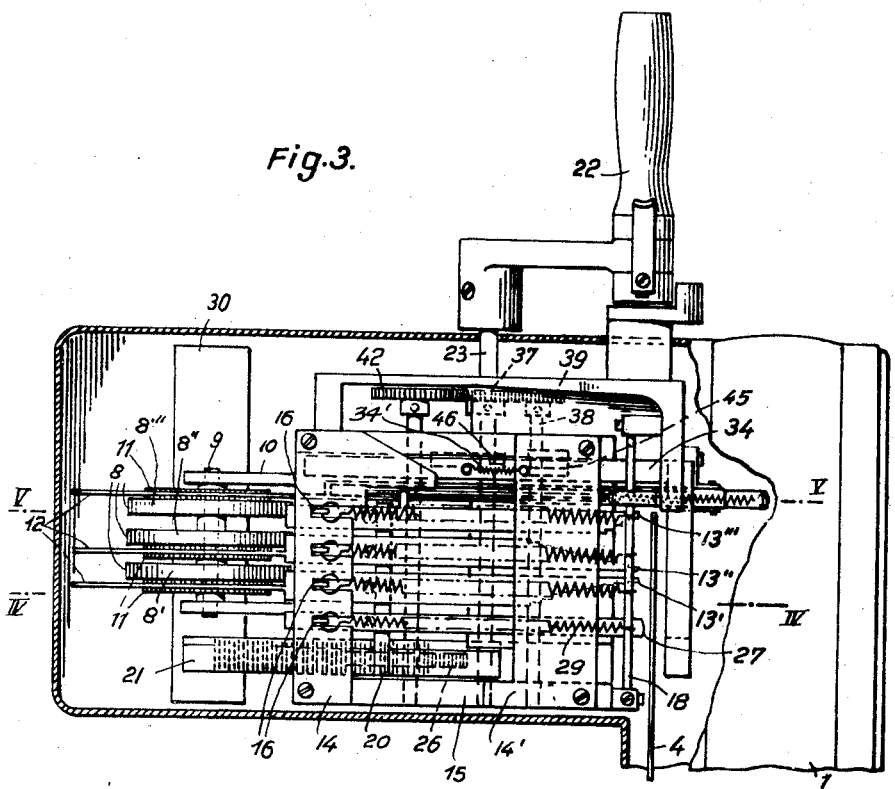
Figure 4:
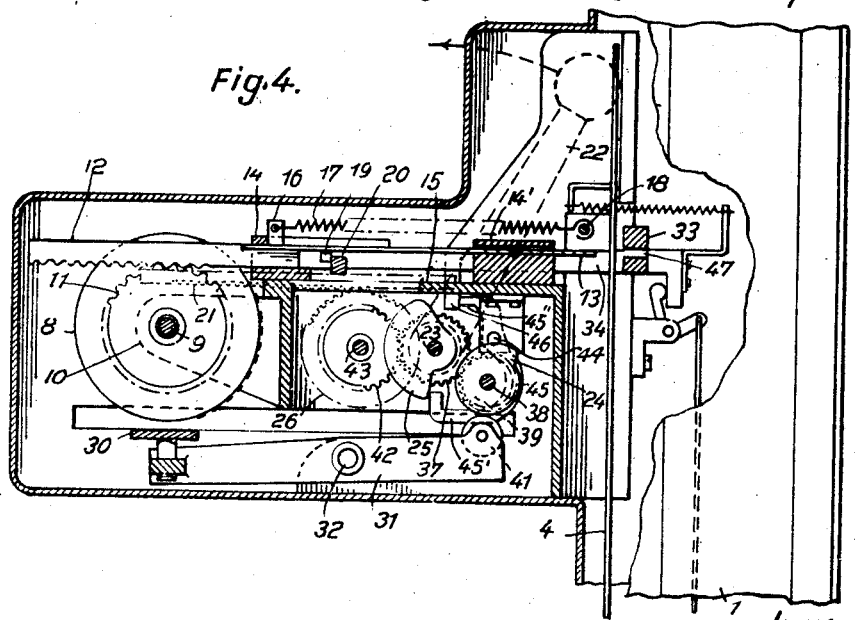
Figure 5:
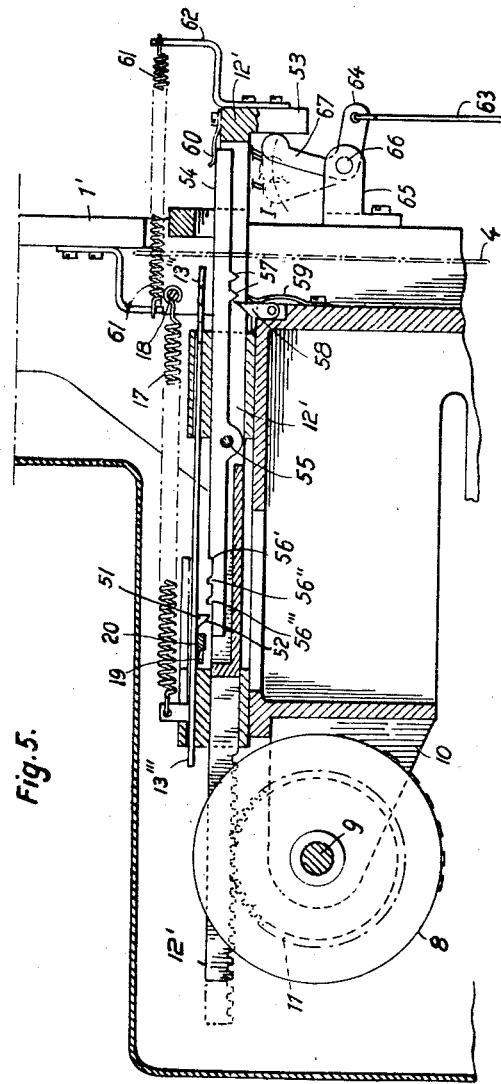
Figure 6:
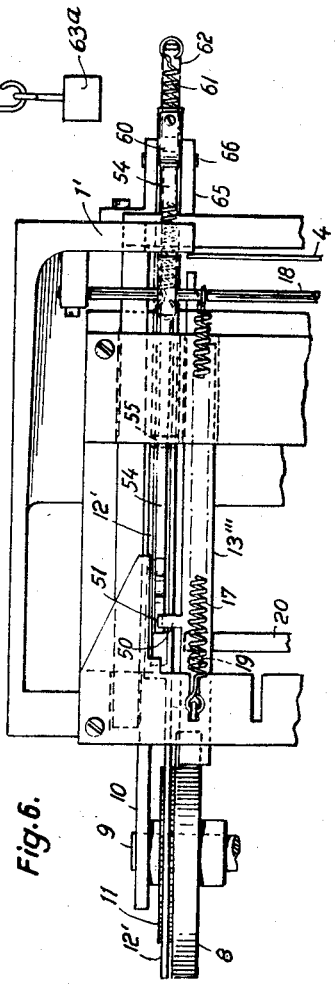
Figure 7:
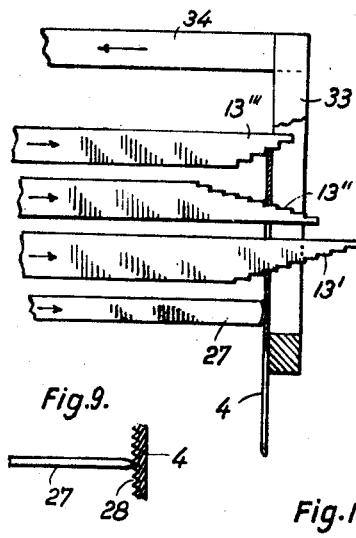
Figure 8:
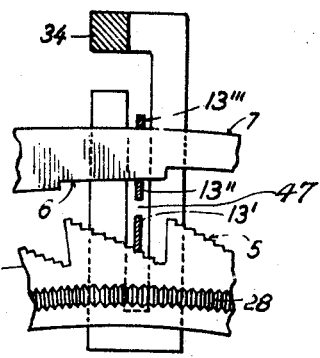
Figure 9:
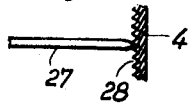
Figure 10:
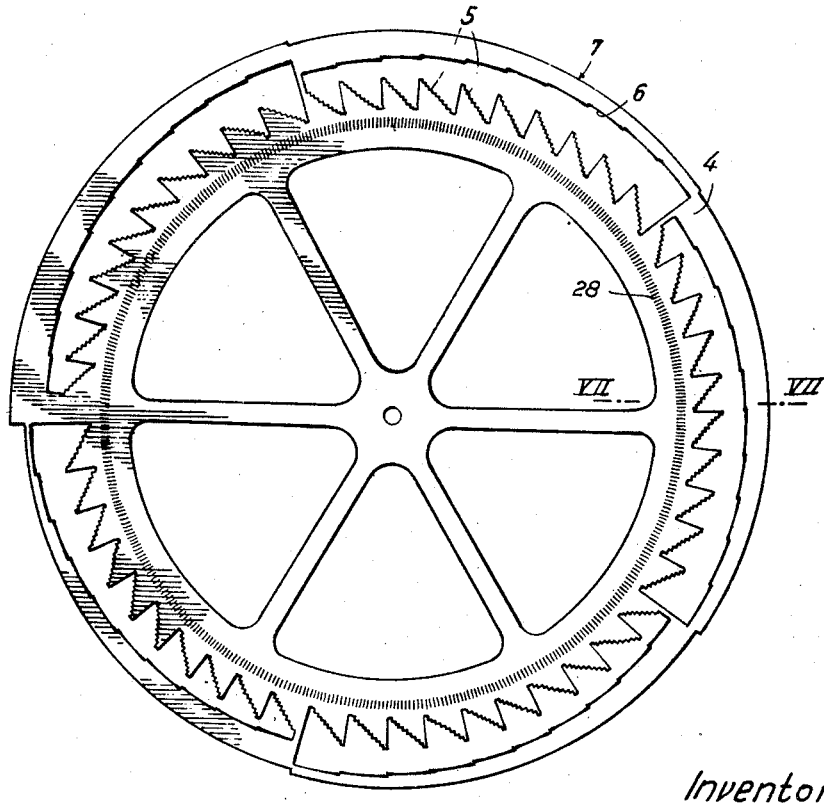

Further details and features of the invention will be apparent from the following description taken in connection with the drawings illustrating an example of the invention and in which:

Figure 1 is a front view, partly broken away, of a weighing scale with printing mechanism, Fig. 2 is a side view of Fig. 1, Fig. 3 is a plan view on an enlarged scale of the printing mechanism with the casing broken away, Fig. 4 is a sectional view taken on line IV—IV of Fig. 3, Fig. 5 is a sectional view taken on line V—V of Fig. 3 on an enlarged scale, Fig. 6 is a plan view of the device of Fig. 5, Fig. 7 is a plan view on an enlarged scale of the feelers, the reinforcing bar and the locking bar in a set position on the disc, Fig. 8 is a side view of Fig. 7, Fig. 9 is a side view of the locking bar in contact with the disc with the latter being shown as a partial section, and Fig. 10 is a front view of the disc.

The weighing scale 1 has the usual indicating hand 2 mounted on a shaft 3, the latter being in operative connection by means of the usual mechanism to the pan or plate on which the article to be weighed is placed. In the form of construction shown this connection comprises a pinion 35 on the shaft 3 on which the pointer 2 is mounted, and a rack 36 connected to the weighing pan or platform of the scales. Also as usual the hand 2 cooperates with a series of weight indicator discs or the like to visibly indicate the article weighed but such details do not form any part of the present invention. The actual invention of this application resides in the printing mechanism and more particularly in the means for setting the actual printing mechanism to print the individual weight amount.

The setting mechanism for the printing device comprises a thin sheet metal disc 4 with cut-out areas or portions forming stepped stop sections 5, 6 and 7. The disc 4 may be stamped out in any usual manner and in the form illustrated in Fig. 10 the stepped stop sections 5 may indicate the units, the section 6 the tens and the section 7 the hundreds. For instance each unit section has ten groups of ten stops, that is a stop for each, the tens section 6 has ten stops and the hundreds section 7 has five stops to a maximum of five hundred. Such a series of divisions and sub-divisions may be used for metric weight measures.

The actual printing mechanism is composed of a plurality of type wheels 8 rotatably mounted on a shaft 9 which is mounted in a casing 10 provided adjacent the scale. Each type wheel 8 has a pinion 11 secured thereto to rotate therewith and each pinion meshes with a rack 12. For units, tens and hundreds there are three type wheels of which wheel 8' has numeral types (0, 1, 2, 3, 4, 5, 6, 7, 8, 9), wheel 8'' has numeral types (0, 1, 2, 3, 4, 5, 6, 7, 8, 9) and 8''' has numeral types (0, 1, 2, 3, 4). The foregoing is merely stated as an example since any scale of numbers can be used depending upon the specific weights which are used and the type of materials for which the scale is designed.

Each rack 12 has a feeler or stepped bar 13 secured thereto of which feelers 13' and 13'' have 9 stepped notches for the units and tens, and 13''' has five stepped notches for the hundreds. These feelers 13 are adapted to slide in guide bars 14 and 14' mounted on plates 15 of the casing 10. Each feeler is provided with a pin 16 mounted thereon to which one end of a tension spring 17 is secured, the other end of the spring being secured to a bar 18 secured in the casing. Also each feeler 13 has a lug 19 secured on the under side thereof, Fig. 4, which abuts, and cooperates with a bar 20, on and secured to a setting rack 21, the bar 20 extending over all the feelers.

The operating device for printing a weight value includes an operating handle 22 mounted on a shaft 23 rotatably mounted in the casing 10. On the shaft 23 there is fixed a gear 37 which meshes with a gear 39 mounted on a shaft 38. The shaft 38 is mounted in the casing 10 and a cam 24 is mounted on this shaft which cam is in contact with a roller 41 mounted on one end of a double-armed lever 31 pivoted at 32. The other end of the lever 31 carries a printing plate 30. The shaft 32 around which the double-armed lever 31 rotates is mounted in the casing 10.

The gear 37 on the shaft 23 is in mesh with a gear 42 which latter is securely mounted on the shaft 43 which is also mounted in the casing 10. On the other end of the shaft 43 there is mounted the gear 26 which is in mesh with a gear rack 21.

On the shaft 23 there is mounted a cam 25 which operates an arm 45' of a double-armed lever 45, which is rotatably mounted at 44 in the casing 10. The other arm 45'' of this lever lies against a projection 46 on the underside of a rack 34, Figs. 3, 7 and 8, the stem 34 of which rack has a part 33 at right angles thereto which forms a V-shaped backing member or reinforcing bar for the disc 4, and is adapted to contact the rear face of the disc. As shown in the drawings, particularly Fig. 8, the reinforcing bar 33 is provided with a slot 47 through which can extend the feelers 13. To prevent the bending of the disc 4 by the pressure of the feelers 13 against the front face of said disc the reinforcing bar is moved into contact with the disc 4 shortly before the feelers actually contact the disc. The reinforcing bar thus takes up the pressure and force of the feelers so that the disc can be made of extremely thin metal, which has the advantage that the scales will quickly come to rest upon each weighing operation, owing to the low inertia. Apart from this the reinforcing bar makes it possible to set a feeler accurately. A locking bar 27, Figs. 3 and 7, is slidably mounted in the guide bars 14 and 14' and is adapted to contact in any one of a plurality of notches or V-shaped grooves 28 provided circumferentially around one side face of the disc 4. The locking bar 27 is also provided with a lug 19 and with a spring 29 secured at one end to the bar 27 and the other end on the rod 18.

The actual invention of this application is illustrated in Figs. 5 and 6 in which the feeler 13''' for the hundreds is provided with a lateral extension 50 provided with a lug 51 having a lateral edge 52. The feeler 13''' is not connected directly with a rack 12, but to separate rack bar 12' slidably mounted in the bars 14 and 14' and extending through the rear wall 1' of the scale, said rack bar 12' having a depending end member 53. The rack bar 12' carries a lever 54 pivotally mounted at approximately the mid point on a pin 55, and this bar has three stop shoulders 56, 56', 56'' on its upper side which cooperate with the lug 51 on the feeler 13''. On the underside of the lever 54 there are two stop teeth 57 which cooperate with a ratchet pawl 58 mounted on the wall 1' of the scales and having a spring 59. Another spring 60 is secured to the top of the rack bar 12' to hold the lever 54 against the lug 51. A further coil spring 61 is secured at one end to the wall plate 1' and at the other end to an extension 62 on the bar 12'. A weight, 63a, is adapted to be hung on a rod 63 which hangs on one end of a bell crank lever 64, which is pivotally mounted, by means of a pin 66, on a bracket 65 secured to the wall plate 1'. The other end of the lever 64 has a head 67 which contacts the depending section 53.

The device operates as follows:

It is assumed that an object or material is weighed which has a weight of 247, the actual measure of weight being immaterial for purpose of illustration. Immediately upon placing the 247 weight object on the scales the hand 2 comes to rest to visibly indicate 247 and the disc 4 rotates with and comes to rest simultaneously with the hand. Then the operator of the scales rotates the hand crank 22 counterclockwise, Fig. 4, which results in a rotation of the shaft 23. Thereby the cam 25 will press on the free end 45' of the double-armed lever 45, so that this lever will be rotated counter-clockwise around its shaft 44, Fig. 4. The other free end 45'' of the lever 45 will press the projection 46, on the reinforcing bar and therewith the rack 34 and said bar against the tension of a spring 34' which has one end secured on the guide bar 14' and the other end on the rack 34, to the left, Fig. 4, so that the reinforcing bar 33 will be likewise moved to the left, this taking place after the disc 4 has moved to its weight indicating position. When the cam 25 has moved the double lever 45 the full distance allowed by the throw of the cam, the reinforcing bar 33 will come to rest against the rear side of the disc 4.

Simultaneously with the rotation of the cam 25 rotation of the gear 26 will also take place due to rotation of the hand crank 22, through the gears 37, 42, whereby the rack 21 will be moved to the right, Fig. 4. Thereby the bar 20 mounted on the rack 21 will move away from the pins 19 on the underside of the feelers 13', 13'', 13''', and the locking bar 27, so that the feelers and the locking bar will be released and moved toward and into the disc under the influence of the springs 17 and 29.

The device operates in such a manner that the locking bar proceeds ahead of the feelers and nearly simultaneously with the reinforcing bar comes in contact with the disc. By means of the locking bar the disc will be arrested while the reinforcing bar prevents the bending of the thin disc. Then the feelers contact the respective stepped cut-out portions in which feeler 13''' for the hundreds contacts the "2" step, the feeler 13'' for the tens contacts the "4" step and the feeler 13' contacts the "7" step, as indicated in the position of the feelers in Fig. 7 which corresponds to the position on the disc on line VII—VII of Fig. 10. During the time that the feelers are being set each rack 12 secured to a feeler will properly set the type wheels. Immediately the feelers are set the further rotation of the handle 22 will cause the cam 24 to rock the lever 31 to force a card or paper sheet or strip against the type wheels 8 to thus print the weight 247 thereon. The parts are then returned to their initial positions by rotating the handle 22 in the clockwise direction back to the position of Fig. 1.

In the foregoing operation the rack 12' of the highest order feeler, Figs. 5 and 6, is in its extreme left hand position when no weight 63a is on the rod 63, and with the head 67 is in the position I, Fig. 5. This is so even when a weight of 247 is on the scale, as long as the feelers are held by the bar 20, in the extreme left hand position, that is until said bar moves to the right. In this position the stop member 56' is against the lug 51 and thus the feeler 13''' will set its type wheel in the normal weight range of 0 to 4, the spring 17 being stronger than the spring 61.

If, and according to the invention of the present application, a weight 63a is hung on the rod 63, to weigh an amount between 500 and 599, the lever will force the rack 12' to the right, Figs. 5 and 6, to the position II and if a heavier weight 63a, to weigh an amount between 600 to 699, is hung on rod 63 the parts will assume the position III as shown. For this purpose the type wheel of highest order, Figs. 5 and 6, is supplied with numerals from 0 to 6 instead of from 0 to 4 and by hanging a weight on the rod 63 the said type wheel is pre-set either one or two steps ahead before the feelers come into operation.

If now a weight of 647 is weighed the feelers will operate in the same manner as for 247 except feeler 13''', Figs. 5 and 6. For such a weight an additional weight is hung on rod 63 so that the rack 12' will be pulled over to the right to position III during which the lever 54 will tilt anti-clockwise (Fig. 5) against the action of spring or check 60 in such a manner that the stop members 56'' and 56''' can pass under the lug 51 to the position of Fig. 5. This tilting is acccomplished by the bevelled sides of the stop points 57 striking the ratchet pawl 58 and riding over the same. The type wheel is now preset to numeral 2 instead of to 0 and when the 647 material is weighed the lug 51 of the feeler 13''' will strike the stop member 56''' which forces the lever 54, and rack 12' to the right against the action of spring 61 to set the type wheel 8 to the numeral 6. After weighing the spring 61 pulls the elements back to the position of Fig. 5.

It is understood that the auxiliary weights 63a added must be such that one of them will stretch the spring 61 sufficiently to bring the depending end member 53 of the rack bar 12' into position II, and the other to bring it into position III, whereby the stop 56'', or the stop 56''' respectively, will co-operate with the lug 51 of the feeler 13'''.

I claim as my invention:

1. A device for presetting a type wheel in a printing weighing machine wherein the type wheel is normally set by a movable feeler, comprising a rack bar having type wheel actuating means and movable independently of the feeler to preset the type wheel, means on said feeler and rack bar for coupling them for drive of said rack bar by said feeler in setting of the wheel to printing position, means for disengaging the coupling whereby said pre-setting movement of the rack bar independent of the feeler can take place, and means for imparting a predetermined independent movement to said rack bar.

2. A device for presetting a type wheel in a printing weighing machine wherein the type wheel is normally set by a movable feeler, comprising a rack bar having type wheel actuating means and movable independently of the feeler to preset the type wheel, means on said feeler and rack bar for coupling them for drive of said rack bar by said feeler in setting of the wheel to printing position, means for disengaging the coupling whereby said pre-setting movement of the rack bar independent of the feeler can take place, and means for imparting a predetermined independent movement to said rack bar, said means including changeable auxiliary weights corresponding to desired increases in the limit weight amount to be printed.

3. A device according to claim 2 in which the coupling means on the rack bar include a plurality of lugs spaced from each other by distances corresponding to different presettings of the type wheel, and co-operating with a coupling lug on the feeler, means being provided to move said rack bar lugs out of the path of the feeler lug in a presetting operation by means of said auxiliary weights.

4. A device for presetting a type wheel in a printing weighing machine wherein the type wheel is normally set by a movable feeler, comprising a rack bar having type wheel actuating means and movable independently of the feeler to preset the type wheel, a drive lug on said feeler, a lever pivoted on said rack bar, said lever having a plurality of spaced lugs co-operating with said drive lug to couple said rack bar to said feeler for drive of the former by the latter in setting the wheel to printing position, means for imparting a predetermined independent movement to said rack bar, and means for temporarily rocking said lever to bring its lug out of co-operation with the feeler lug during said independent presetting movement of the rack bar.

5. A device for presetting a type wheel in a printing weighing machine wherein the type wheel is normally set by a movable feeler, comprising a rack bar having type wheel actuating means and movable independently of the feeler to preset the type wheel, a drive lug on said feeler, a lever pivoted on said rack bar, said lever having a plurality of spaced lugs co-operating with said drive lug to couple said rack bar to said feeler for drive of the former by the latter in setting the wheel to printing position, means for imparting a predetermined independent movement to said rack bar, said means including changeable auxiliary weights corresponding to desired increases in the limit weight amount to be printed, and means for temporarily rocking said lever to bring its lugs out of co-operation with the feeler lug during said independent presetting movement of the rack bar.

6. A device for presetting a type wheel in a printing weighing machine wherein the type wheel is normally set by a movable feeler, comprising a rack bar having type wheel actuating means and movable independently of the feeler to preset the type wheel, spring means opposing presetting movement of the rack bar, another spring means opposing movement of the feeler, means on said feeler and rack bar for coupling them for drive of said rack bar by said feeler in setting of the wheel to printing position, means for disengaging the coupling whereby said pre-setting movement of the rack bar independent of the feeler can take place, and means for imparting a predetermined independent movement to said rack bar, said means including changeable auxiliary weights corresponding to desired increases in the limit weight amount to be printed.

7. A device according to claim 1 in which the independent pre-setting movement of the rack bar automatically disengages the coupling.

8. A device according to claim 2 in which the auxiliary weights actuate the rack bar through a bell crank lever on an arm of which engages an extension of said rack bar.

ARTHUR HAHN.